May 28, 1940.　　W. F. SCHULTZ　　2,202,606
FLUID METER
Filed July 9, 1938　　3 Sheets-Sheet 1

INVENTOR.
WILLIAM F. SCHULTZ

BY

Wheeler, Wheeler + Wheeler
ATTORNEYS

May 28, 1940.  W. F. SCHULTZ  2,202,606
FLUID METER
Filed July 9, 1938   3 Sheets-Sheet 2

INVENTOR.
WILLIAM F. SCHULTZ
BY Wheeler, Wheeler, & Wheeler
ATTORNEYS

May 28, 1940. W. F. SCHULTZ 2,202,606
FLUID METER
Filed July 9, 1938 3 Sheets-Sheet 3

INVENTOR.
WILLIAM F. SCHULTZ
BY
Wheeler, Wheeler & Wheeler
ATTORNEYS

Patented May 28, 1940

2,202,606

UNITED STATES PATENT OFFICE 2,202,606

FLUID METER

William F. Schultz, Ripon, Wis.

Application July 9, 1938, Serial No. 218,341

14 Claims. (Cl. 73—221)

This invention relates to improvements in fluid meters.

It is the primary object of the invention to provide novel and improved metering mechanism of a type in which metering chambers are alternately filled and drained, it being my purpose to provide inlet and outlet valves which are controlled with a snap action in such a manner that at least one of the four valves involved is independently operated while the other three operate simultaneously in each cycle of operation.

More specifically, it is one of the important objects of the present invention to provide means whereby the respective float chambers are filled immediately, the rate of filling being much higher than the rate of consumption therefrom, and the filling operation being independently controlled by the float movement to cease at a predetermined level in each respective chamber. Thereupon the initiation of drainage from the filled chamber and the initiation of the filling operation in the other chamber will depend wholly upon the completion of the drainage of said other chamber.

Another object of the invention is to provide enclosed means which can readily be sealed and which will nevertheless permit of the individual adjustment of each float in its respective chamber, the mechanism being completely housed to function within the chamber without requiring rock shafts or connecting rods to pass through any openings in the housing. More specifically it is my purpose to provide a housing in which two compartments are formed by a partition which extends only to an intermediate point of the housing, all of the interconnecting mechanism being disposed above the partition and comprising merely a lever fulcrumed on a rock shaft above the partition.

Other objects will appear in more detail from the following disclosure.

In the drawings.

Like parts are identified by the same reference characters throughout the several views.

Figure 1:
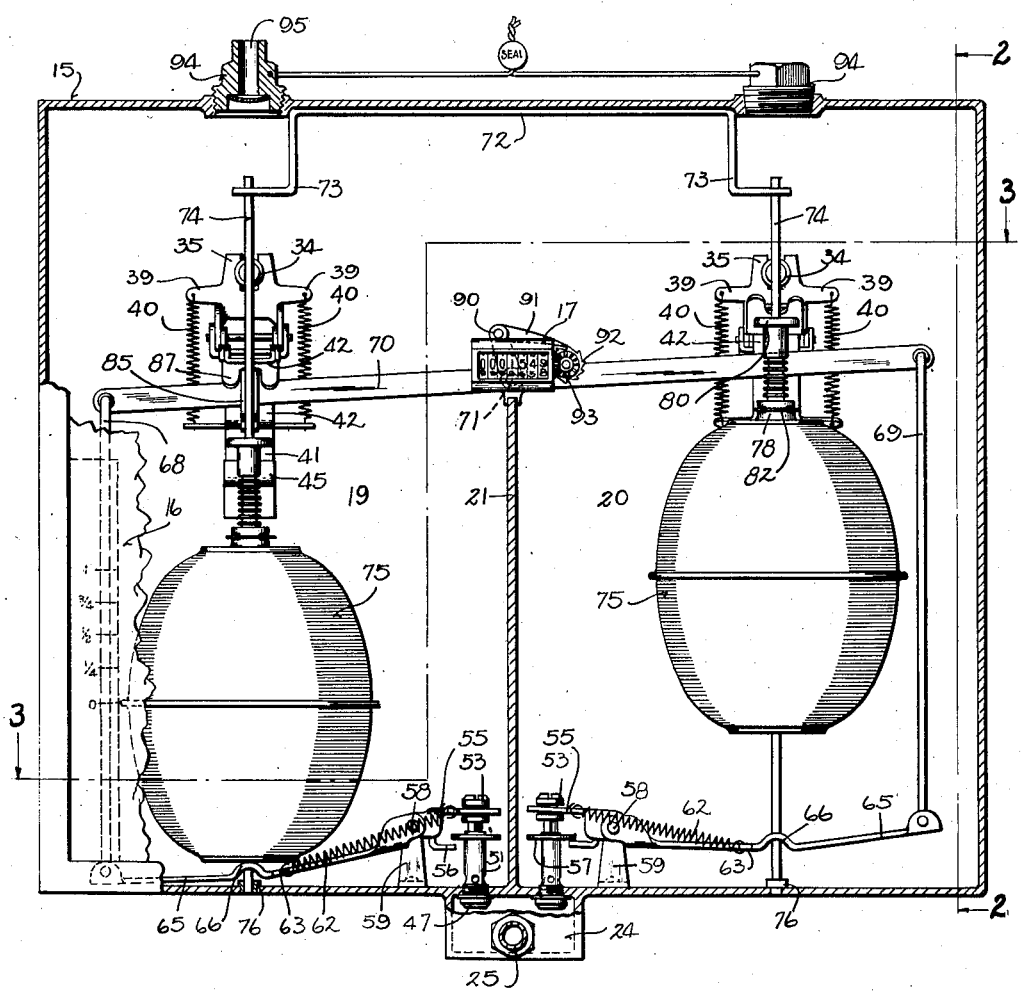
Figure 1 is a view partially in front elevation and partially in transverse section through the housing of a metering device embodying this invention.

The meter casing 15 comprises a box preferably having a transparent front wall 16 of glass or the like, through which the meter register 17 is visible. Instead of making the entire front wall of glass it is obviously possible to provide a window therein for the reading of the register. The interior of the casing 15 is divided at its lower portion into compartments 19 and 20 by a partition 21 which extends from front to rear of the casing and terminates at a level well below the top thereof. The register 17 is mounted from the upper margin of this partition.

Across the back of the casing 15 is a supply manifold 22 to which the liquid to be metered is delivered by means of a pipe 23. Beneath the bottom of the casing is a discharge manifold 24 from which a discharge pipe 25 leads the meter liquid. The input manifold 22 and the discharge manifold 24 are each provided with valve openings through the wall of the casing communicating with the respective chambers 19 and 20 within the casing.

Figure 4:
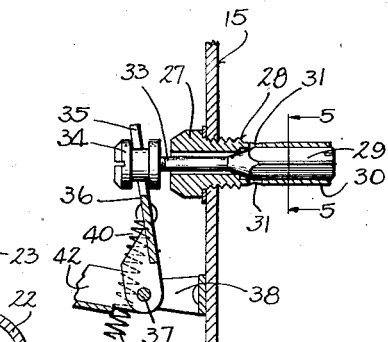
Figure 4 is a fragmentary detail view in axial section through the inlet valve.
Figure 5:
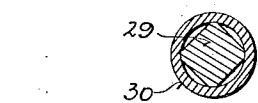
Figure 5 is a detail view taken in section on an enlarged scale on the line 5—5 of Figure 4.

Each of the inlets may be identical with the construction disclosed by way of exemplification of Figs. 4 and 5. A bushing 27 screwed into the rear wall of the casing provides a valve seat at 28 which is engaged by the squared valve plug 29. This plug is reciprocable in a sleeve 30 which constitutes an extension into manifold 22 of the bushing 27. The liquid from the manifold passes along the flat faces of the plug or through the apertures 31 to the seat 28, and if the valve is moved to the right from the position shown in Fig. 4 to its open position the liquid will pass through the bushing 27 to a position above one of the chambers 19 and 20 and will fall into the chamber.

Figure 2:
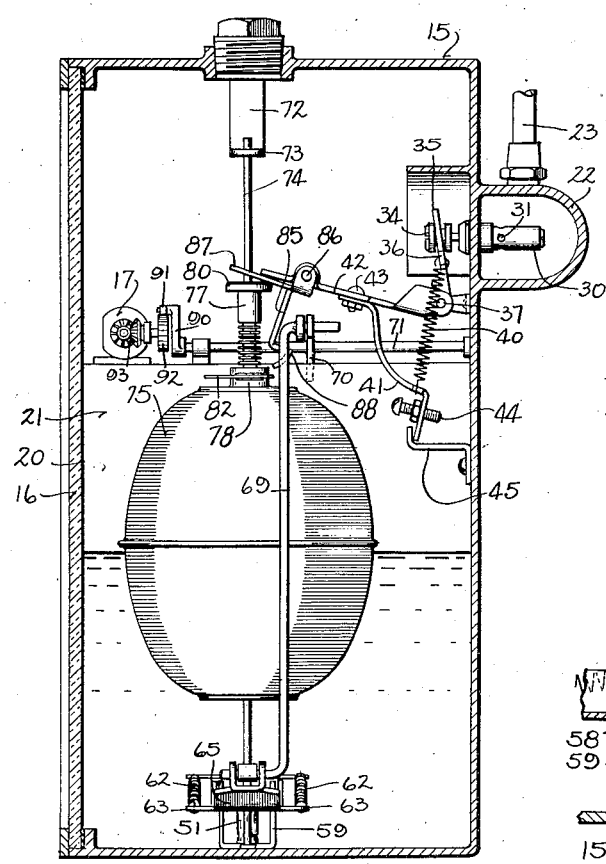
Figure 2 is a view of the apparatus in section in the plane indicated at 2—2 in Figure 1.

Integral with the valve plug 29 is a valve stem 33 having a spool-shaped head 34 engaged by the forked end portion 35 of a lever 36 fulcrumed by means of pin 37 on bracket 38. Arms 39 which project laterally from the lever as shown in Fig. 1 carry tension springs 40 which are connected with arms 41 on another lever 42 fulcrumed on the same pin 37. Arms 41 carry set screws 44 which function as adjustable stops for engagement with the rear wall of the casing to limit the oscillation of the respective levers 42 in a counterclockwise direction as viewed in Fig. 2. The clockwise oscillation of levers 42 is limited by the bracket 45 shown in Fig. 2. The arms 41 are bodily adjustable longitudinally of levers 42 and are held in adjustment by bolts 43. Their adjustment preferably times the inlet to open just after the corresponding discharge valve has closed.

The lever 35 which is directly connected with the spool-shaped head 34 of the valve stem, is moved entirely by the tension of spring 40 as said spring is swung across the center line of the fulcrum pin 37 in the course of the oscillation of lever 42. This results in a snap movement of the valve plug 29 in both directions of its operation between its open and closed positions.

Figure 6:
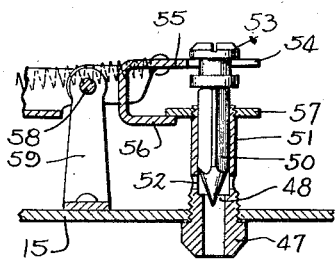
Figure 6 is a fragmentary detail view in axial section through one of the drain valves.

A similar arrangement is provided for the control of the outlet ports. The outlet bushings 47 provide valve seats at 48 for the valve plugs 50 which move in the sleeve-like extensions 51 of bushings 47. In Fig. 6 the valve is shown in its open position to permit flow from the appropriate chamber through the holes 52 and past the valve seat 48 into the discharge manifold 24.

Both inlet and outlet valves open against the pressure and seat in the direction of flow.

Valve plug 50 is provided with a spool-shaped head at 53 controlled by the forked terminal 54 of the lever 55. An arm 56 on lever 55 engages the adjustable stop nut 57 threaded to sleeve 51 and thus limits the opening movement of the valve.

Figure 3:
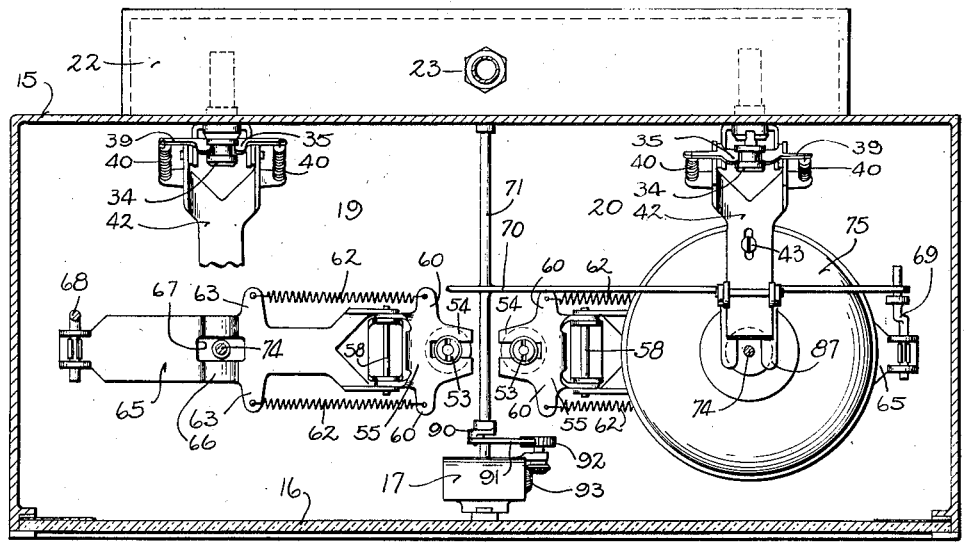
Figure 3 is a view of the apparatus taken in horizontal section on the line 3—3 of Figure 1.

Lever 55 is fulcrumed on the pin 58 carried by a standard 59. Lever 55 has laterally extending arms 60 (Fig. 3) connected by tension springs 62 with the corresponding arms 63 of the lever 65. This lever is likewise fulcrumed on the pin 58 of standard 59 and extends thence across the chamber to a position near the side wall of casing 15, the two valves being disposed adjacent the central partition 21. The lever 65 is preferably provided near its center with an upwardly arched transverse rib portion 66 centrally slotted at 67 to pass the float guide hereinafter to be described.

Connecting rods 68 and 69 connect the free ends of the respective levers 65 with the lever 70 which extends transversely across the casing and which is centrally fulcrumed on the rock shaft 71. The length of the connecting rods 68 and 69 is such as to operate the outlet valves synchronously in opposite directions, the one valve being always open when the other is closed. When one of the levers 65 is swung in an upward direction the other is swung in a downward direction, and the two sets of springs 62 controlling the respective discharge valves move across center substantially at the same instant so that as one valve closes the other one opens to maintain a constant flow to the discharge manifold from one or the other of chambers 19 and 20.

In the top of the casing a bracket 72 has depending arms 73 fixing the positions of the upper ends of the respective guide rods 74 upon which the floats 75 are reciprocable. The lower ends of the respective guide rods 74 are fixed in bosses 76 in the bottom of the casing.

Figure 7:
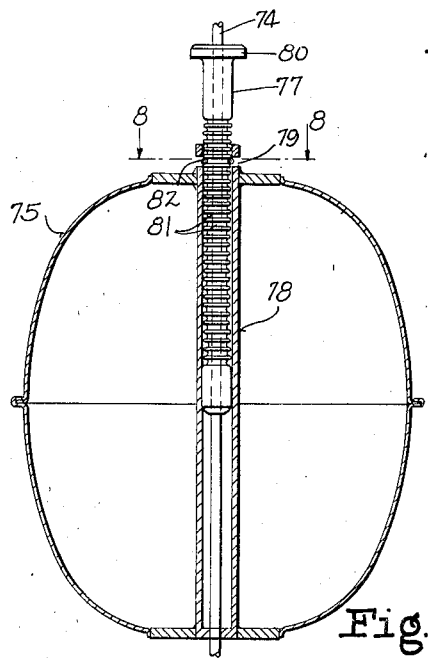
Figure 7 is a detail view on an enlarged scale showing the adjustable relation between the float and its valve actuating member.
Figures 9, 10:
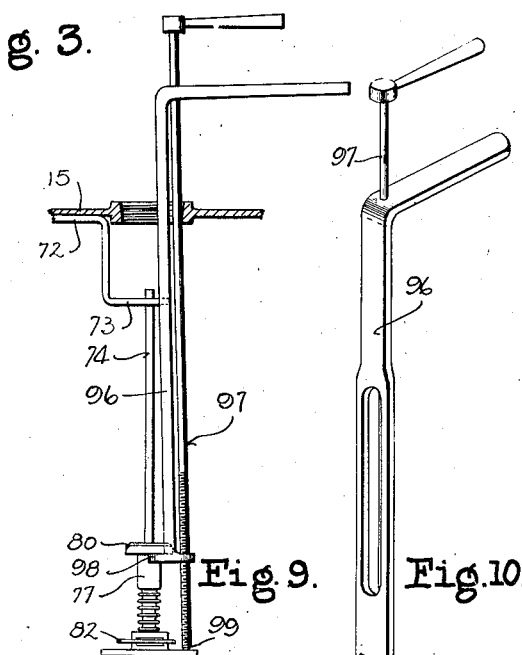
Figure 9 is a detail view in elevation showing a tool which I have devised for manipulation of the float for the adjustment of the meter.
Figure 10 is a view of the tool in perspective.
Figure 8:
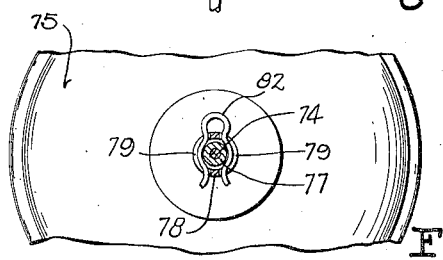
Figure 8 is a fragmentary detail view taken on line 8—8 of Figure 7.

The upper ends of the respective floats 75 do not bear directly upon the guide rods 74 but are adjustable upon the valve actuating sleeves 77 as shown in Figs. 7, 8 and 9. Each float is assembled upon a tube 78 transversely slotted at 79 above the top of the float. The sleeves 77 are provided below their operating heads 80 with a series of peripheral grooves 81. A spring key 82 having its legs formed for engagement in slots 79, is so biased that such legs are in pressure engagement with the sleeve 77 in one of the grooves 81 thereof, thus providing a yieldable detent for releasably maintaining any desired adjustment between the sleeve 77 and the float 75, while permitting each float complete freedom of rotative movement on its guide 74.

The extension of sleeve 77 above the top of the float will determine the instant at which the filling of either compartment will be terminated by the rising of the float. The levers 42 which actuate the springs that control the separate inlet valves are releasably connected by means of the latch members 85 to the lever 70. Each of the latch members 85 is fulcrumed at 86 to one of the levers 42, the weight of its trip arm 87 tending to maintain its hooked portion 88 in engagement beneath the lever 70.

As a given float 75 rises in its chamber it will encounter the trip arm 87 of the latch 85, thus withdrawing the latch hook 88 from beneath lever 70. The continued upward movement of the float will cause the trip arm 87 to engage the free end of lever 42, thus oscillating the lever 42 upwardly until the springs 40 connected therewith cross the center of the fulcrum pin 37, thereby tripping the inlet valve in a valve closing direction.

The chamber served by this inlet valve will now be full, but the closing of the inlet valve of this chamber will not interfere with the continued draining of the companion chamber. Only when the companion chamber is fully drained will the downwardly moving float therein encounter the transverse rib 66 of the appropriate discharge valve lever 65 to oscillate that lever in a direction to move springs 62 across center to the point where the discharge valve of such chamber will snap shut. This motion, however, will be transmitted through the link 68 or 69 to the lever 70 and through the other link to the other discharge valve lever 65 to move said other discharge valve lever upwardly in a valve opening direction, the arrangement being such that as the one discharge valve snaps closed the other will simultaneously snap open so as to permit the uninterrupted flow of liquid through the discharge manifold 24.

The above described movement of lever 70 has performed an additional function in that it has opened the inlet valve serving the recently discharged chamber. It will be noted from Fig. 2 that until a given float reaches its uppermost position on the guide rod 74, the latch member 88 connects the lever 70 with the inlet valve actuating lever 42. Consequently as float 75 has moved downwardly in chamber 19 (Fig. 1), its final movements which tilted lever 70 have not only closed the discharge valve leading from chamber 19, but have transmitted movement through the appropriate latch 88 from lever 70 to the appropriate lever 42 for concurrently opening the inlet valve 29 serving chamber 19.

Thus, it will be observed that following the draining of any given chamber three valves are concurrently operated. The discharge valve for that chamber is closed, the discharge valve for the other chamber is opened, and the inlet valve leading to the recently drained chamber is opened. The closing of a given inlet valve is independently accomplished by the rising of the float in the filled chamber.

In a given cycle of operation of the device the lever 70 is tilted first in one direction and then the other. This tilts the rock shaft 71 upon which lever 70 is fulcrumed, and the movement of the rock shaft is transmitted by means of an arm 90 and pawl 91 to a ratchet wheel 92 connected by bevel gearing at 93 (Fig. 1) to the counter or register 17 upon which the total flowage through the meter may be totalized in gallons or any other suitable unit of measure.

For adjusting the registration of the device either of floats 75, or both of them, may be adjusted on sleeves 77 in the manner already described. Plugs at 94 are normally sealed in screw threaded connection with the top of the meter casing 15, at least one of the plugs being preferably vented at 95 through a screened opening. Upon the removal of these plugs a special tool may be inserted as indicated in Figs. 9 and 10, such tool being designed to clear the bracket 73 and to provide relatively movable rods 96 and 97 with adjacent handles. Rod 96 is a tension member having a forked work-engaging part at 98. Rod 97 operates through a threaded bearing in the fork 98 and engages the end of the float. When the handles of the two rods are relatively rotated with the tool in the position shown in Fig. 9, the work engaging parts 98 and 99 of the respective rods are separated, with the result that the head 80 of sleeve 77 is subjected to tension in such a way as to draw the sleeve through the spring detent 82, thus decreasing the extent to which the float must rise before it trips the inlet valve in a valve closing direction. Mere pressure on head 80 by engagement of the fork 98 thereabove will force the sleeve 77 into the float to increase the extent to which the float must rise before tripping the inlet valve in its closing direction.

I claim:

1. In a meter of the character described, the combination with a casing provided with a partition defining chambers, said partition being open to provide communication between said chambers over the partition and above the level of liquid in said casing, a lever pivoted adjacent the point at which said partition affords communication between said chambers, said lever overhanging the respective chambers, inlet and outlet valves for the respective chambers, float means determinative of liquid levels in the chambers and adapted to maintain such levels below the point of communication therebetween, and valve controlling mechanism operatively positioned to be acted on by the float means of the respective chambers and including connections from the respective discharge valves to said lever, and means whereby the float actuated closing movement of the discharge valve of one chamber will transmit motion through said lever to open the discharge valve of the other chamber and the inlet valve serving the chamber in which the discharge valve is closed, each of said float means having connections for individually operating the respective inlet valve of a particular chamber in a closing direction.

2. In a meter of the character described, the combination with a casing providing a plurality of chambers, of a snap action inlet valve and a snap action outlet valve for each chamber, a float in each chamber, means for transmitting the upward movement of each float individually to the inlet valve serving the chamber in which the float is located for the movement of said valve in a closing direction, and means for transmitting the downward movement of the float of each chamber to the respective discharge valves of both chambers to close the discharge valve to the chamber in which the float is moving downwardly, to open the discharge valve of the other chamber, said means also being provided with connections to open the inlet valve of the chamber in which the discharge valve is closed.

3. In a device of the character described, the combination with a casing provided with a central partition sub-dividing said casing into chambers and affording communication between said chambers in the upper part of the casing, a lever pivoted in said upper part of the casing and overhanging both of said chambers, snap action discharge valves located near the bottoms of the respective chambers and provided with operating levers having their free ends linked to the ends of said first mentioned lever, floats provided with means guiding them for reciprocation in the respective chambers and adapted in their downward movement to operate the associated discharge valve actuating lever in a valve closing direction, the connection of the actuated lever through the first lever with the lever controlling the other discharge valve being adapted to open said other discharge valve, inlet valves serving the respective chambers, means for actuating the inlet valves, latch mechanism detachably connecting said inlet valve operating means with said first lever to transmit valve opening movement from said lever to the inlet valve serving a chamber in which the outlet valve is being actuated by said float to its closed position, and means for releasing said latch mechanism and for transmitting the rising motion of a float individually to the inlet valve serving the chamber in which such float rises.

4. A device of the character described, comprising the combination with a valve, of a valve actuating lever, a float, a float actuated lever, latch mechanism detachably connecting said levers for operation in one direction, and trip means connected with said latch mechanism for the release thereof and the direct and independent operation of the valve actuating lever by the float in the opposite direction of float movement.

5. A meter of the character described, comprising the combination with a casing having an internal partition providing separate chambers in said casing, a lever fulcrumed over said partition and projecting into the respective chambers, snap actuating discharge valves located adjacent the partition and adjacent the bottoms of the respective chambers for the emptying thereof, actuating levers for said snap action valves extending oppositely from said partition beneath the free ends of the first mentioned lever, links connecting the ends of the first lever with the ends of said discharge valve actuating levers for the transmission of valve opening movement to one lever consequent upon the valve closing movement of the other, inlet valves serving the respective chambers, and floats provided with means guiding them for movement in the respective chambers and having connections for the operation of the several valves, at least one of said floats having valve actuating means with respect to which such float is adjustable.

6. In a device of the character described, the combination with a pair of chambers, floats in the respective chambers and inlet and discharge valves for the respective chambers, of means connecting the discharge valves for substantially concurrent action in opposite directions whereby one of said valves is opened when the other is closed, said means including parts operatively disposed in the respective chambers to receive motion from the descending float in the chamber in which the discharge valve is to be closed, mechanism for transmitting motion from said means to open the inlet valve to said last mentioned chamber substantially concurrently with the closing of the discharge valve therein, said mechanism comprising a float releasable latch and a part operable by the rising float in each chamber for closing the respective inlet valve thereof.

7. In a device of the character described, the combination with a pair of chambers and means providing inlet and outlet ports individually serving the respective chambers, of snap action valve mechanisms including valves controlling the respective ports, means operable by a float descending in either of said chambers for substantially concurrently actuating the discharge valves of the respective chambers in opposite directions, whereby to close the discharge valve in the chamber in which the float is descending and to open the discharge valve in the other of said chambers, and latch mechanisms for connecting the said discharge valve actuating means with the respective snap action mechanism of the inlet valves of said chambers, each such latch mechanism including a latch releasing part disposed in the path of the float rising in the chamber served by the respective valve for the release of the latch mechanism and the float operated closing movement of the inlet valve independently of the automatic opening of the other inlet valve through its latch mechanism substantially concurrently with the opposite movement of the discharge valves aforesaid.

8. In a device of the character described, the combination with a pair of chambers provided with discharge ports and discharge valves, of snap action mechanism controlling the respective valves in the respective chambers, each comprising a lever extending across said chamber, floats operable in the respective chambers and engageable with the respective levers to actuate the snap mechanisms controlling the respective valves, lever means connecting said levers for opposite and substantially concurrent movement whereby one valve opens as the other is closed by a descending float, inlet valve means for the respective chambers, snap action mechanisms controlling the respective inlet valve means and provided with parts disposed in the paths of the respective floats to be actuated by the rising thereof beyond predetermined positions in the respective chambers for the actuation of the snap action mechanisms to close the respective inlet valves as their respective floats are raised, and latch mechanisms releasably connecting the respective parts with said lever means for actuation by said lever means in a valve opening direction, said latch mechanisms including float-released detent means for freeing them from said lever means upon the rising of their respective floats, whereby to permit the independent closing of the inlet valves by the floats as aforesaid.

9. In a device of the character described, the sub-combination of an inlet valve provided with snap actuating control means including a lever, latch mechanism including a part pivoted to said valve and adjustable with respect thereto and a detent connected with said part to be adjusted thereby, a first valve actuator engageable with said part and adapted to move said detent to a released position, said part being engageable with said lever in said position to transmit the movement of said first actuator to said lever for the operation of said snap means in a valve closing direction, and a second actuator movable in a direction opposite to the movement of the first actuator and with which said detent is normally engageable, said second actuator being adapted to transmit motion through said detent and lever to said snap action means for the opening of said valve.

10. In a device of the character described, the sub-combination which includes a valve, snap action mechanism including a lever and a spring controlling the movement of said valve between its open and closed positions, a float comprising an actuator, and means operatively guiding the float for movement in a path such that said actuator may operate said lever and snap action mechanism to close the valve, a releasable latch connected with said lever and provided with a part adapted to move said latch to its released position, said part being interposed between said actuator and lever to be initially engaged by said actuator for the release of said latch preliminary to the actuation of said lever, and a second actuator movable in opposition to the direction of valve closing movement of said float and with which said latch is normally engaged, said latch being biased for movement toward engagement with said second actuator upon release of the pressure of said float.

11. In a device of the character described, the combination with a plurality of chambers having exhaust ports and means providing inlet ports for the respective chambers, of valves controlling the several ports and adjustable between open and closed positions, snap action mechanisms connected with the respective valves to require decisive opening and closing movements thereof, the snap action mechanisms controlling the exhaust port valves including levers extending across the bottoms of the respective chambers and the snap action mechanisms controlling the respective inlet port valves comprising levers extending across the upper portions of the respective chambers, lever and link means connecting the levers of the exhaust port valve snap action mechanisms for substantially concurrent operation in opposite directions, whereby to open the exhaust port valve of one chamber upon the closing of the exhaust port valve of the other, floats provided with means guiding them for movement in the respective chambers, said floats being engageable with the exhaust port snap action levers whereby to close the exhaust port valve of a given chamber upon the descent of the float therein, latch means connected with the lever of the snap action mechanism of each inlet port valve, said latch means being biased for engagement with said link and lever means for the transmission of motion from said link and lever means to the inlet port valve snap action mechanism in a direction to open the inlet port of a given chamber substantially concurrently with the closing of the exhaust port valve, said latch means including an adjusting part disposed in the path of the rising float of the respective chamber to receive motion from such rising float to release the latch and to transmit continued motion of said float to the snap action lever in a direction for the closing of the inlet valve for the chamber in which the rising float is located.

12. A meter of the character described, comprising a casing having a plurality of chambers, floats provided with means guiding them for movement in the respective chamber, valve means adapted to be actuated by the respective floats, and actuating means connected with the respective floats comprising a peripherally grooved member axially adjustable through one of said floats, and a spring detent carried by the float and engageable with a groove of said member releasably to maintain its position.

13. A meter of the character described, comprising a casing providing a plurality of chambers, floats provided with means guiding them for movement in the respective chambers, valves controlling flow to and from the respective chambers and operatively connected for actuation by said floats, and means for transmitting motion from one of said floats to one of said valves including a sleeve telescopically extensible respecting the float, said chamber having a plug so located as to receive a tool by means of which the sleeve and the float are relatively adjustable, said sleeve and float having means for frictionally retaining their respective adjustments.

14. A meter of the character described, comprising a casing partitioned to provide chambers and provided with plugs centered over the respective chambers, rods upright in the respective chambers terminating short of the tops thereof, bracket means engaged in the tops of said rods to maintain their positions in the chamber, sleeves reciprocable on the rods, floats in telescopic connection with the respective sleeves, means for yieldably maintaining the adjustment of the respective floats in regard to their respective sleeves, and tool engageable means carried by the respective sleeves and floats adapted for manipulation by the tool in a given chamber upon the removal of the plug thereof, and valve mechanisms individual to the respective chambers and including parts engageable by the respective sleeves to transmit the motion of said float for the operation of said valve mechanisms.

WILLIAM F. SCHULTZ.